United States Patent
Sugaya (10) Patent No.: US 8,319,879 B2
(45) Date of Patent: Nov. 27, 2012

(54) ELECTRONIC APPARATUS

(75) Inventor: Kazuki Sugaya, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 282 days.

(21) Appl. No.: 12/869,135

(22) Filed: Aug. 26, 2010

(65) Prior Publication Data

US 2011/0050973 A1 Mar. 3, 2011

(30) Foreign Application Priority Data

Aug. 31, 2009 (JP) .................................. 2009-200448

(51) Int. Cl.
*H04N 5/222* (2006.01)
*H04N 5/225* (2006.01)

(52) U.S. Cl. .................................. 348/333.01; 348/373

(58) Field of Classification Search ............. 348/333.01, 348/373–376; 349/58, 59, 65, 150, 152
See application file for complete search history.

(56) References Cited

U.S. PATENT DOCUMENTS

| | | | | |
|---|---|---|---|---|
| 7,586,576 B2 * | 9/2009 | Park et al. | ...................... | 349/150 |
| 2006/0087601 A1 * | 4/2006 | Lee | ................................. | 349/60 |
| 2006/0139271 A1 * | 6/2006 | Okuda | ............................ | 345/88 |
| 2007/0002546 A1 * | 1/2007 | Nomura et al. | ................ | 361/748 |
| 2007/0242150 A1 * | 10/2007 | Terada | ..................... | 348/333.06 |
| 2008/0204623 A1 * | 8/2008 | Tanaka | ............................ | 349/58 |

FOREIGN PATENT DOCUMENTS

JP 10-319308 A 12/1998

* cited by examiner

*Primary Examiner* — John Villecco
*Assistant Examiner* — Selam Gebriel
(74) *Attorney, Agent, or Firm* — Canon U.S.A., Inc. IP Division

(57) ABSTRACT

An apparatus includes a display unit including a display screen, an exterior member mounted on the display unit and having an opening for exposing the display screen, a first flexible board having a check pad formed thereon, and a second flexible board located on a surface opposite the display screen and having an insulating portion formed thereon. Before the display unit is mounted on the exterior member, the check pad is exposed from the opening, and the first flexible board is disposed on the exterior member so that the check pad faces the insulating portion after the display unit is mounted on the exterior member.

3 Claims, 7 Drawing Sheets

ELECTRONIC APPARATUS

BACKGROUND OF THE INVENTION

1. Field of the Invention

The present invention relates to an electronic apparatus, and in particular, relates to the location of a check pad for an inner portion of an electronic apparatus.

2. Description of the Related Art

Figure 5A:
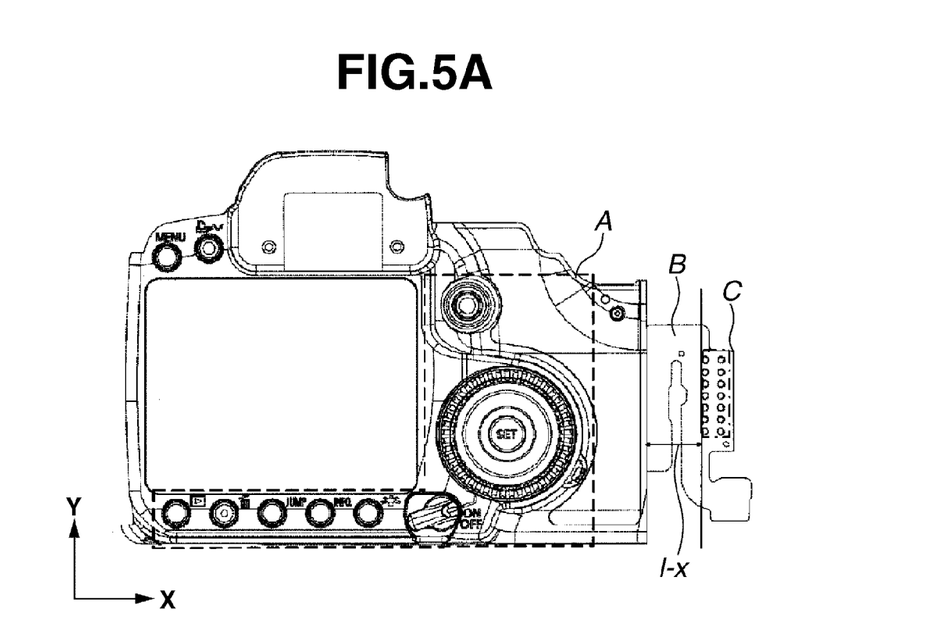
FIGS. 5A to 5C illustrate a conventional configuration of an operation verification pad for an electrical mounted component configured as a camera back face cover unit.
Figure 5B:
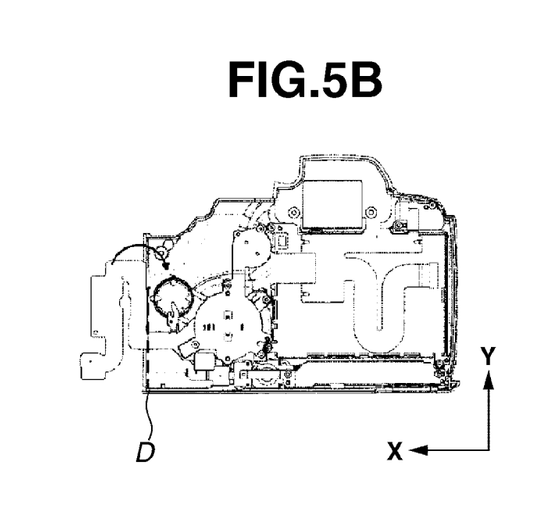
Figure 5C:
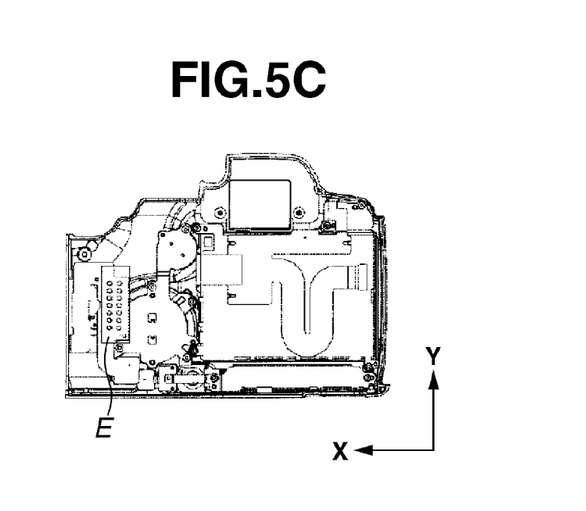

As discussed in Japanese Patent Application Laid-Open No. 10-319308, a pad is known that is used to verify the operation of operation members of a camera located in an inner portion of the camera. Furthermore, during an assembly process of the camera, verification of the operation of the operation members of the camera is executed using a camera back face cover unit. FIGS. 5A to 5C illustrate a camera back face cover that enables verification of the operation of the operation members of a camera using the camera back face cover unit. FIG. 5A is a front view illustrating the camera back face cover during verification of the operation of the operation members of the camera. FIG. 5B is a back view illustrating the camera back face cover for verification of the operation of the operation members of the camera. FIG. 5C is a rear view illustrating the status during assembly of the camera back face cover into the main body.

In FIG. 5A, an operation member A is operable to change camera settings (AF area, shutter speed, and the like), which is attached to the camera back face cover portion. A flexible printed circuit board (FPC) B transmits a signal from the operation member A to a camera main body. An operation verification pad C is used to check the signal from the operation member A when the assembly of the camera back face cover unit is completed. The operation verification pad C is mounted on the FPC B. The operation verification pad C is located on the front surface of the camera back face cover at a distance of at least 1−x, which is a distance at which a pedestal for an inspection pin (not illustrated), which contacts the operation verification pad C during checking of the operation of the operation member A, does not interfere with the camera back face cover member.

When built into the camera, the FPC B is configured to be connected to the camera main body while being folded through 180° (the state illustrated in FIG. 5C) along a folding line D illustrated in FIG. 5B.

However, the camera back face cover unit illustrated in FIG. 5A to FIG. 5C shows that the operation verification pad C is located at a distance 1−x from the camera back face cover unit. As a result, situations in that the size of the PFC B in FIG. 5A is increased and the cost associated with the flexible printed circuit board increases may arise. Furthermore, since a conductive portion of the operation verification pad C illustrated in FIG. 5C is disposed facing the camera main body when built into the camera, there is the risk of a short circuit resulting from contact between the conductive portion and conductive components in the inner portion of the camera. Consequently, for separate insulation, an insulating member E (an insulating substrate tape made of polyimide or the like) may be used. In this manner, problems arise in relation to an increase in the number of components resulting from the addition of the insulating member E, or an increase in the number of assembly steps resulting from sticking of the insulating member E.

SUMMARY OF THE INVENTION

According to an aspect of the present invention, an apparatus includes a display unit including a display screen, an exterior member mounted on the display unit and having an opening for exposing the display screen, a first flexible board having a check pad formed thereon, and a second flexible board located on a surface opposite the display screen and having an insulating portion formed thereon. Before the display unit is mounted on the exterior member, the check pad is exposed from the opening, and the first flexible board is disposed on the exterior member so that the check pad faces the insulating portion after the display unit is mounted on the exterior member.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 2A and 2B are exploded perspective views illustrating a configuration of a camera back face cover unit according to an exemplary embodiment of the present invention, wherein

FIGS. 4A to 4C illustrate a configuration of the camera according to an exemplary embodiment of the present invention, wherein

DESCRIPTION OF THE EMBODIMENTS

Various exemplary embodiments, features, and aspects of the invention will be described in detail below with reference to the drawings.

Figure 1:
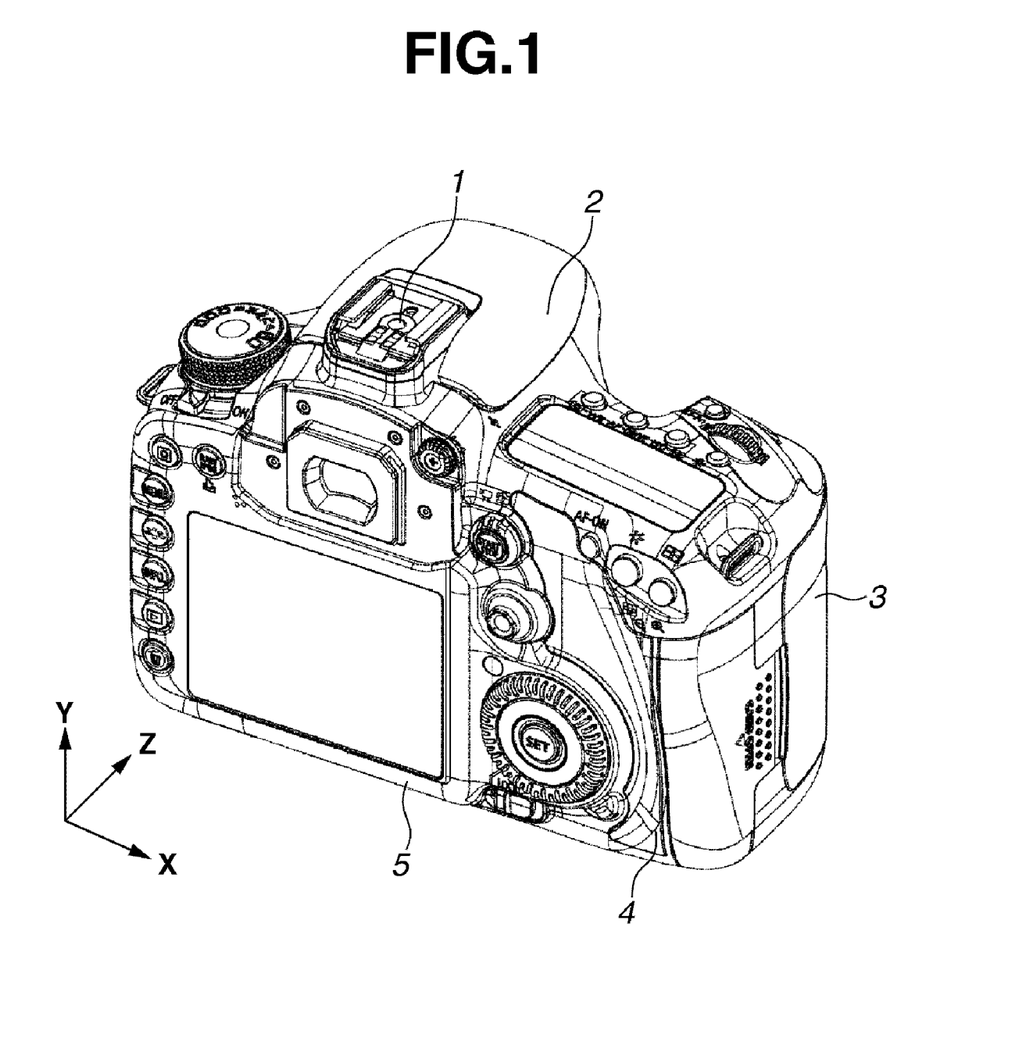
FIG. 1 is a perspective view of a camera as seen from a back face, illustrating a configuration of the camera, according to an exemplary embodiment of the present invention.

FIG. 1 illustrates a configuration of a camera as an example of an electronic apparatus according to a first exemplary embodiment of the present invention. As illustrated in FIG. 1, the camera includes a camera main body 1, a camera upper surface cover unit 2, a camera front surface cover unit 3, a camera lower surface cover unit 4, and a camera back face cover unit 5. The external surface of the camera is configured by the arrangement of the above four cover units.

Next, a configuration of the camera back face cover unit 5 according to the present exemplary embodiment will be described with reference to FIG. 2A and FIG. 2B.

Figure 2A:
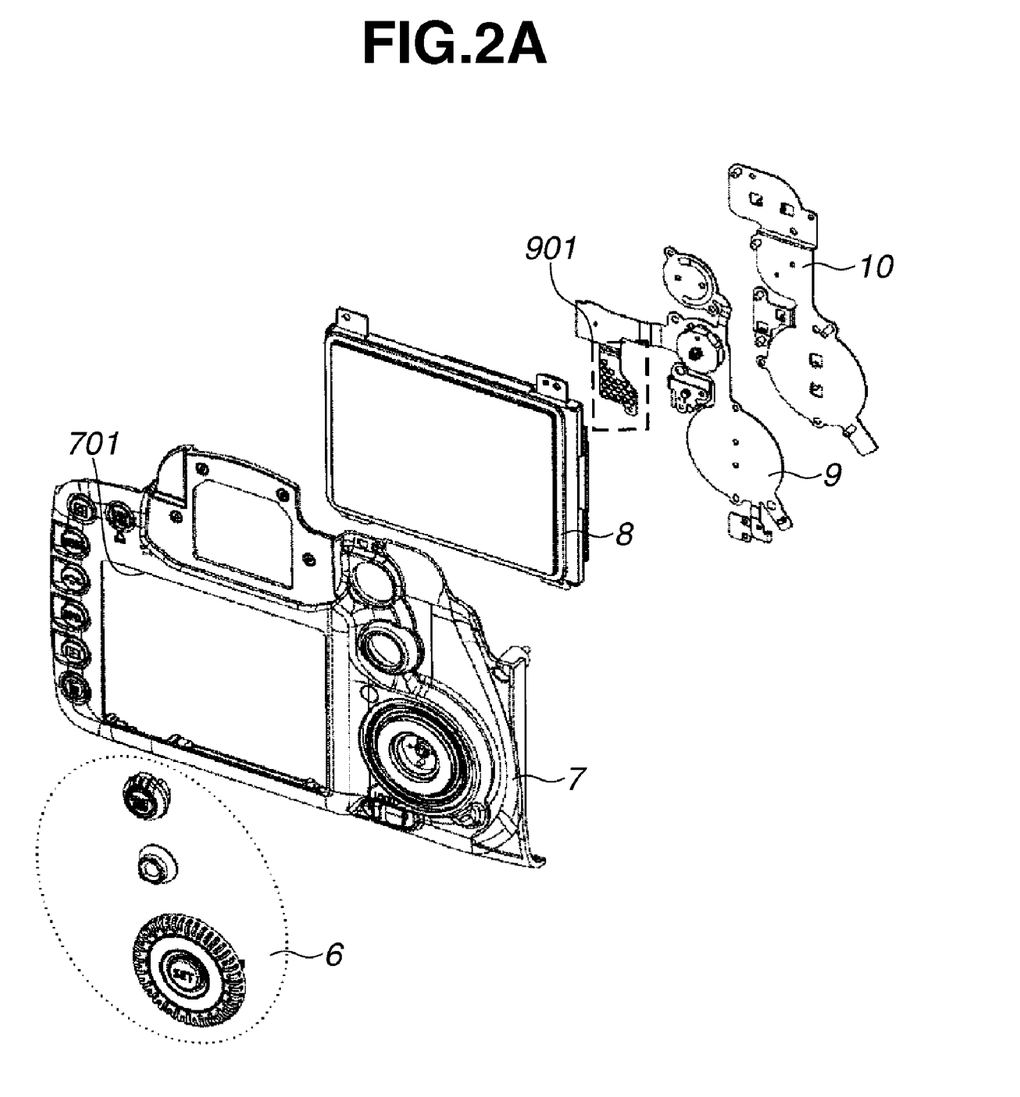
FIG. 2A is an exploded perspective view of a back face cover member of the camera.

Referring to an exploded perspective view of the camera back face cover unit 5 illustrated in FIG. 2A, a camera back face cover 7 functions as an exterior member. The camera back face cover 7 has an opening 701 for exposing a display screen of a liquid-crystal display device unit 8 when the liquid-crystal display device unit 8 is fitted in the housing 701.

A camera back face operation member 6 is used to set camera shooting conditions (for example, AF area selection, shutter speed, and the like). The liquid-crystal display device unit 8 functions as a display unit. An FPC (first flexible board) 9 is electrically connected to the camera main body 1 via an FPC 801 (second flexible board) so that a signal caused by an operation of the camera back face operation member 6 is transmitted to the camera main body 1.

An operation verification pad (check pad) 901 is used for operation verification of the camera back face operation member 6. A plate 10 is used to fix the FPC 9 to the camera back face cover unit 5.

Figure 2B:
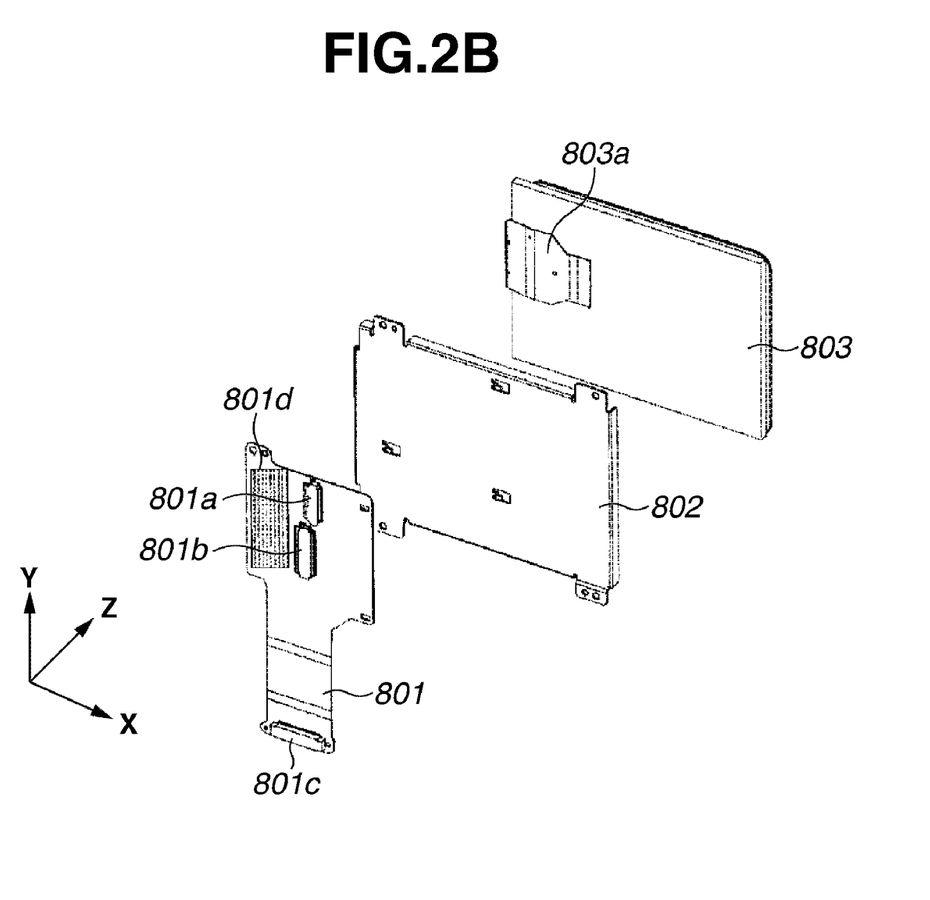
FIG. 2B is an exploded perspective view of a display unit of the camera.

In an exploded perspective view of the liquid-crystal display device unit 8 illustrated in FIG. 2B, the camera back face cover unit relay FPC 801 is disposed on a surface opposite the display screen of the liquid-crystal display device unit 8. The relay FPC 801 includes a connector 801a, a connector 801b, and a connector 801c. The connector 801a is connected to the FPC 9, which transmits a signal from the camera back face operation member 6. The connector 801b extends from a liquid-crystal display device 803 and is connected to an FPC 803a (third flexible board), which transmits a signal from the liquid-crystal display device 803. The connector 801c is connected to a main board (not illustrated) to transmit signals from the relay FPC 801 and the FPC 803a to the main board. A region facing the FPC 9 when the FPC 9 is connected to the connector 801a and a region facing the FPC 803a when the FPC 803a is connected to the connector 801b correspond to an insulating portion 801d, which is completely covered by a coverlay (an insulating material made of polyimide or the like).

A retaining member 802 retains the FPC 801 and the liquid-crystal display device 803, and is assembled as a unit onto the camera back face cover 7.

Figure 3:
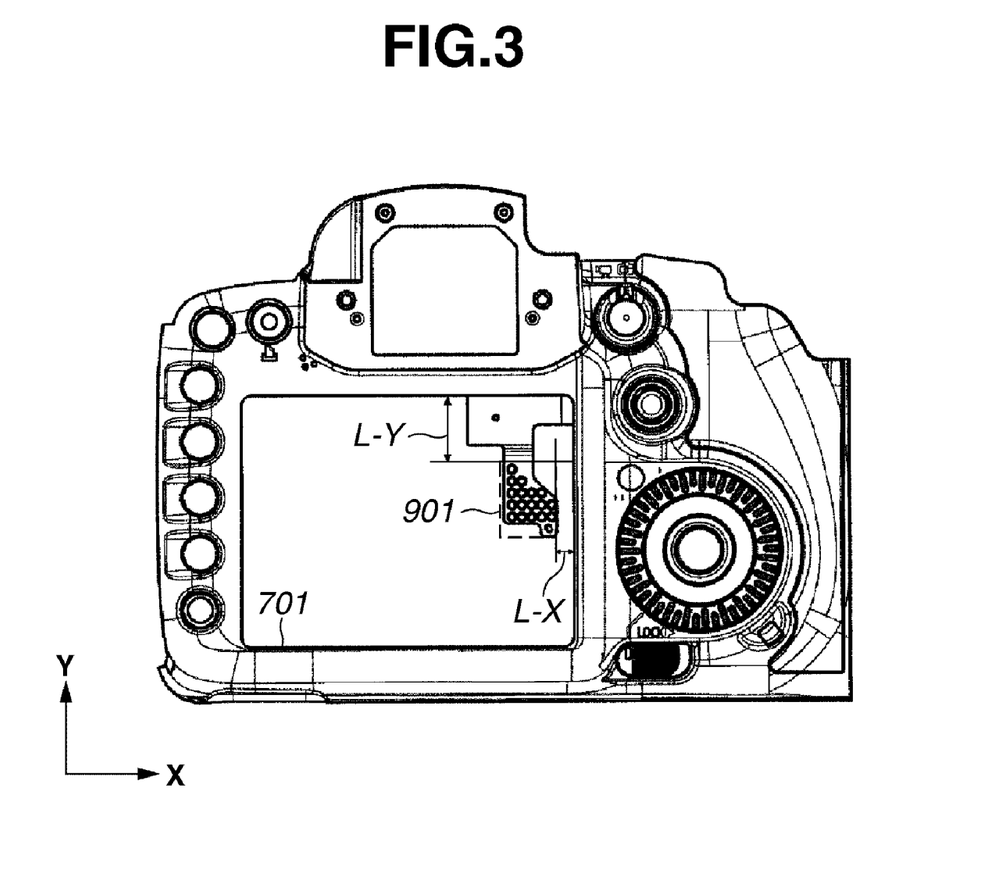
FIG. 3 is a front view of the camera back face cover unit illustrating an operation verification state of a camera back face operation member according to an exemplary embodiment of the present invention.

Next, the camera back face cover unit 5 will be described with reference to FIG. 3. FIG. 3 is a front view of a back face cover in a state in which the operation member 6 and the FPC 9 are assembled onto the camera back face cover 7. During assembly of the camera back face cover unit 5, firstly the operation member 6 and the FPC 9 for the camera back face operation member are assembled onto the camera back face cover 7. In the assembly process, operation verification of the camera back face operation member 6 can be executed in this status. Since the liquid-crystal display device unit 8 is a high-cost component, after confirming that the camera back face operation member 6 functions correctly, the liquid-crystal display device unit 8 is assembled into the camera back face cover 7.

Next, the configuration during operation verification of the camera back face operation member 6 as illustrated in FIG. 3 will be described.

The operation verification pad 901 for the camera back face operation member 6 is disposed in the opening 701 for insertion and engagement of the liquid-crystal display device unit 8 provided on the camera back face cover 7. The opening 701 is formed as a through hole without the provision of a transparent acrylic plate or the like. The distance L–X and the distance L–Y are the distances from the end of the opening 701 in the X direction and the Y direction in which the pedestal for the operation verification pin (not illustrated) used during checking of the camera back face operation member 6 does not interfere with the camera back face cover 7.

The operation verification pad 901 is disposed at a position that is away from the end of the opening 701 by greater than or equal to the distance L–X and the distance L–Y.

The configuration described above enables downsizing of the FPC 9 for verification of operation of the camera back face operation member 6 and, during operation verification of the camera back face operation member 6, does not use a conventional expanded shape or a shape which is bent at 180° when assembled into the camera main body 1.

As a result, the mounting characteristics of the FPC are improved and FPC-related manufacturing costs can be reduced.

Figure 4A:
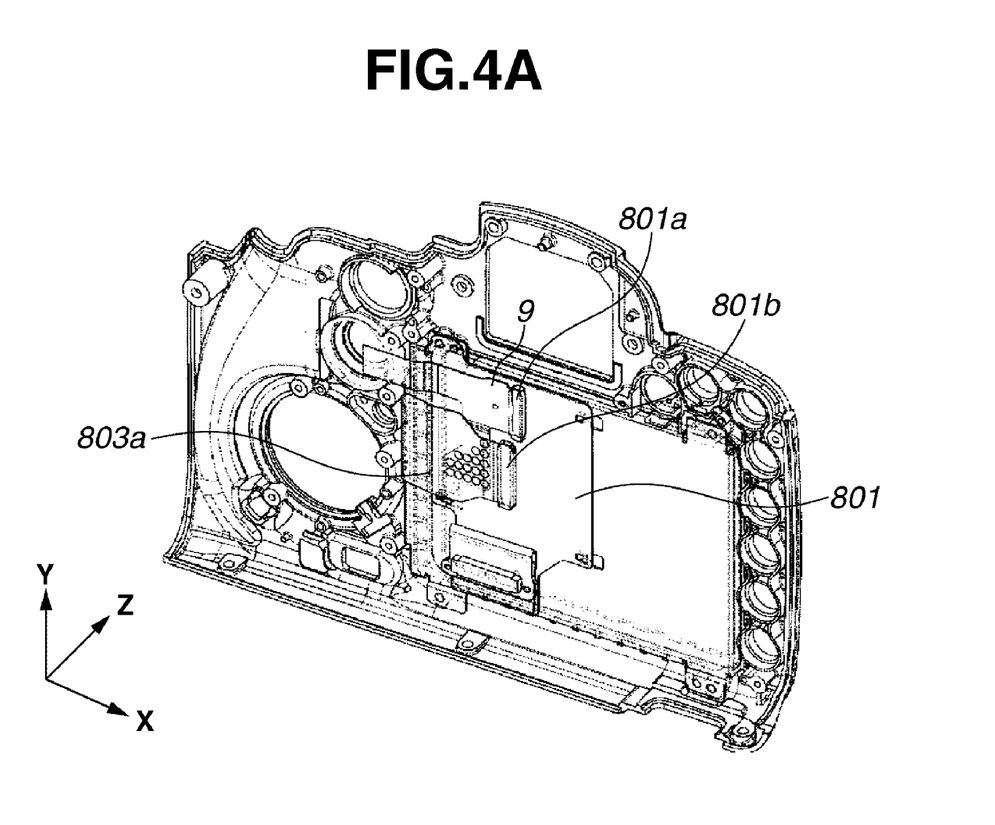
FIG. 4A is a simplified rear perspective view illustrating the completed state of the camera back face cover unit.

Next, the connection relationship of the FPC will be described with reference to FIG. 4A. FIG. 4A is a simplified rear perspective view illustrating assembly of the liquid-crystal display device unit 8 onto the camera back face cover 7 after completion of a functional check of the camera back face operation member 6 using the operation verification pad 901 described in FIG. 3.

When assembling the liquid-crystal display device unit 803 into the opening 701, the operation verification pad 901 is retracted from the opening 701 while being elastically deformed without being bent, and the liquid-crystal display device unit 8 is then assembled into the opening 701.

The retracted state of the operation verification pad 901 is then cancelled so that the operation verification pad 901 overlaps with the relay FPC 801. The operation verification pad 901 is positioned to face the insulating portion 801d of the relay FPC 801. The insulating portion 801d is insulated by a coverlay (an insulation material made of polyimide or the like), and, therefore, the operation verification pad 901 is in an insulated state.

Next, the FPC 9, which transmits a signal from the camera back face operation member 6, is connected to the connector 801a mounted on the relay FPC 801. The operation verification pad 901 is thus sandwiched between the FPC 803a and the relay FPC 801. The FPC 803a, which transmits a signal from the liquid-crystal display device unit 803, is then connected to the connector 801b mounted on the FPC 801. The operation verification pad 901 is thus sandwiched between the FPC 803a and the relay FPC 801.

Figure 4B:
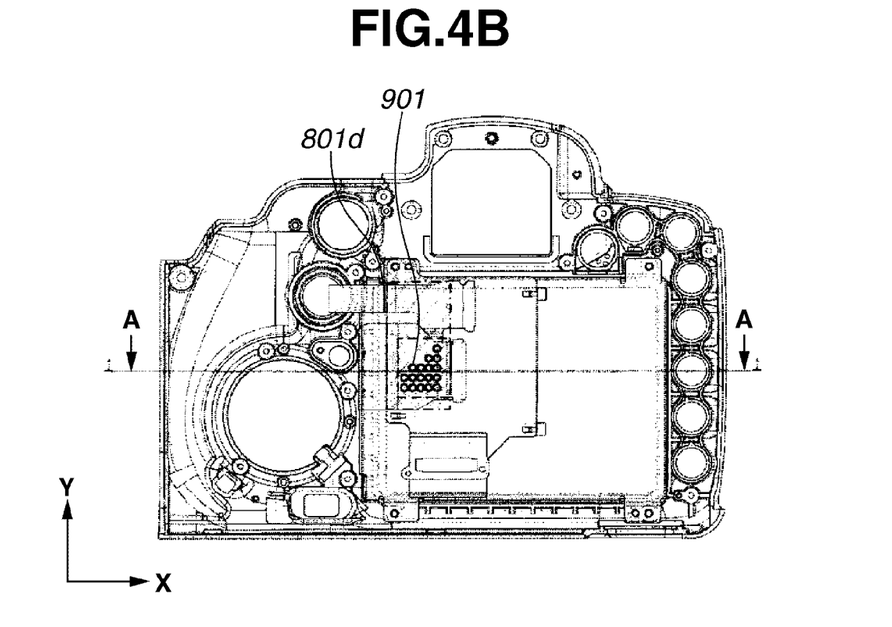
FIG. 4B is a simplified rear view illustrating the completed state of the camera back face cover unit.

The positional relationship between the relay FPC 801 and the operation verification pad 901, which is used to confirm operation of the camera back face operation member 6, will be described with reference to FIG. 4B.

The operation verification pad 901 is disposed facing the insulating portion 801d with respect to the relay FPC 801. Thus, the operation verification pad 901 is insulated. Furthermore, since the operation verification pad 901 is sandwiched between the FPC 9 and the FPC 803a while facing the insulating portion 801d, the operation verification pad 901 does not move freely in the camera main body 1 and is fixedly pressed by the insulating portion 801d.

The above configuration enables checking of an operation of the camera back face operation member 6 using the operation verification pad 901. Thereafter, since the insulating portion 801d of the relay FPC 801 and the operation verification pad 901 are disposed in the positional relationship described above during assembly of the liquid-crystal display device unit 8, the operation verification pad 901 can be insulated without use of a separate pad insulating member.

In this manner, the number of components can be reduced by eliminating an insulating member for the operation verification pad 901, and costs can be reduced by reducing the number of processing steps related to sticking an insulating member to the operation verification pad 901.

Figure 4C:
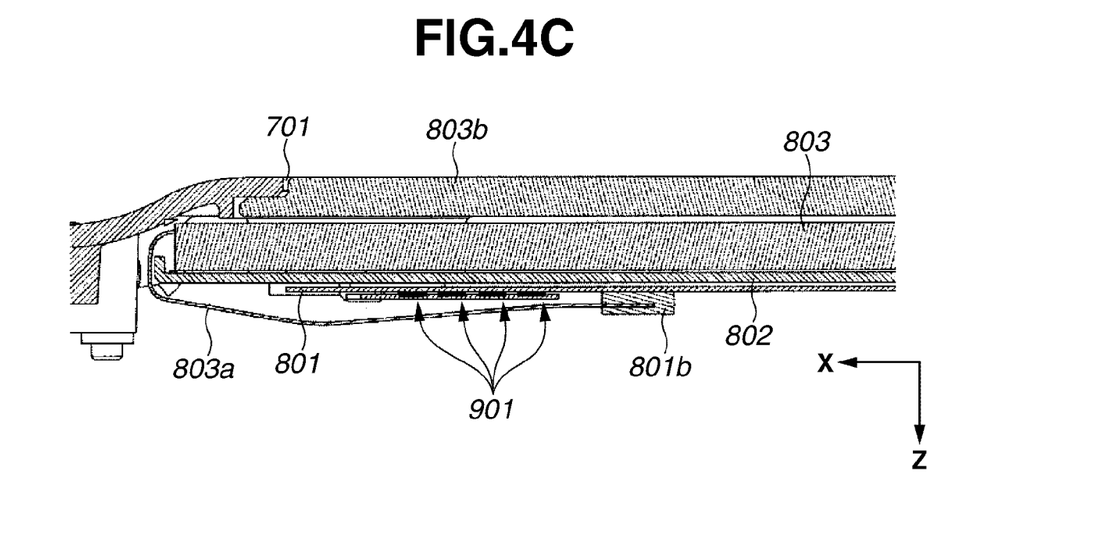
FIG. 4C is a sectional view taken along line A-A in FIG. 4B.

The cross-sectional configuration of the camera back face cover 7 according to the present exemplary embodiment will be described below with reference to FIG. 4C. A liquid-crystal display device protection cover 803b, which is disposed on the front surface of the liquid crystal display device 803, is engaged and assembled with the opening 701 for the liquid crystal display device 803 provided on the camera back face cover 7.

The retaining member (retaining plate) 802 is fixed in such a manner as to fix the liquid crystal display device 803 and the protective cover 803*b* to the camera back face cover 7. Furthermore, the relay FPC 801 is fixed to the retaining member 802, and the FPC 803*a*, which transmits a signal from the liquid crystal display device 803, is connected to the connector 801*b* mounted on the relay FPC 801. The operation verification pad 901 disposed on the FPC 9, which transmits a signal from the camera back face operation member 6, is sandwiched between the relay FPC 801 and the FPC 803*a*, which transmits a signal from the liquid crystal display device 803. This configuration enables the conductive portion of the operation verification pad 901 to be insulated by the insulating portion 801*d* of the relay FPC 801, and the FPC 803*a* is connected in such a manner as to cover the operation verification pad 901 from the back side of the surface on which the conductive portion of the operation verification pad 901 of the FPC 9 is formed. In this manner, a movement of the FPC 9 in the section surface direction can be restricted.

In the unlikely event that the FPC 9 on which the operation verification pad 901 disposed becomes detached during the assembly process, the operation verification pad 901 can be covered by the FPC 803*a* or the coverlay portion of the FPC 9. Consequently, there is no need to provide a separate insulating member as in a conventional configuration, and costs can be reduced by a reduction in both the number of components number and the number of processing steps.

According to the configuration of the camera according to the above exemplary embodiment, the operation verification pad 901 for the camera operation member 6, which is mounted on the camera back face, can be disposed in the opening 701 provided in the camera back face cover 7 for mounting the liquid crystal display device 803. In this manner, the camera can be downsized in comparison to a conventional configuration.

In other words, an FPC that transmits a signal from a camera operation member can be disposed from the end portion of the opening to a position that avoids interference by the pedestal for the operation verification pin without adopting a configuration in which the FPC is bent through 180° and connected to the camera main body as in a conventional example.

In this manner, an FPC that transmits a signal from a camera operation member can be downsized, and manufacturing costs associated with the FPC can be reduced. Furthermore, an insulating member that is used in a conventional configuration can be omitted by adopting a configuration in which the operation verification pad 901 is disposed to face the insulating portion 801*d* formed on the relay FPC 801. In this manner, the number of assembly steps and the number of components can be reduced, thus realizing cost savings.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-200448 filed Aug. 31, 2009, which is hereby incorporated by reference herein in its entirety.

What is claimed is:

1. An apparatus comprising:
a display unit including a display screen;
an exterior member mounted on the display unit and having an opening for exposing the display screen;
a first flexible board having a check pad formed thereon;
a second flexible board located on a surface opposite the display screen and having an insulating portion formed thereon; and
a third flexible board connected to a connector that is mounted on the second flexible board,
wherein the first flexible board is disposed on the exterior member so that the check pad is exposed from the opening before the display unit is mounted on the exterior member, and the check pad is disposed between the insulating portion and the third flexible board after the display unit is mounted on the exterior member.

2. The apparatus according to claim 1, wherein the third flexible board includes a flexible board that extends from the display unit.

3. The apparatus according to claim 1, further comprising an operation member disposed on the exterior member,
wherein the check pad checks an operation of the operation member.

* * * * *